(12) United States Patent
Aaron (10) Patent No.: US 6,402,090 B1
(45) Date of Patent: Jun. 11, 2002

(54) BALLOON TRAJECTORY CONTROL SYSTEM

(75) Inventor: Kim Maynard Aaron, La Crescenta, CA (US)

(73) Assignee: Global Aerospace Corporation, Altadena, CA (US)

( * ) Notice: Subject to any disclaimer, the term of this patent is extended or adjusted under 35 U.S.C. 154(b) by 0 days.

(21) Appl. No.: 09/106,563

(22) Filed: Jun. 29, 1998

(51) Int. Cl.[7] .................................................. B64B 1/40
(52) U.S. Cl. .............................. 244/24; 244/31; 244/27
(58) Field of Search ............................. 244/24, 27, 31, 244/32, 30

(56) References Cited

U.S. PATENT DOCUMENTS

| | | | | |
|---|---|---|---|---|
| 1,652,997 A | * | 12/1927 | Azarraga | 244/24 |
| 1,839,005 A | | 12/1931 | Wander, Jr. | 244/10 |
| 3,135,482 A | * | 6/1964 | Girard | 244/901 |
| 4,050,653 A | * | 9/1977 | Sayers | 244/32 |
| 4,375,280 A | * | 3/1983 | Nicolaides | 244/30 |
| 5,333,814 A | * | 8/1994 | Wallis | 244/1 TD |

FOREIGN PATENT DOCUMENTS

| | | |
|---|---|---|
| FR | 2 452 423 A | 10/1980 |
| FR | 2 588 821 A | 4/1987 |
| FR | 2 668 751 A | 5/1992 |

OTHER PUBLICATIONS

Global Aerospace Corporation; "Stratosail Balloon Trajectory Control System Overview"; Web Home Page, 'Online! XP002118447 Retrieved from the Internet: <URL;http://www.gaerospace.com/publicPages/projectPages/StratoSail/index.html>'retrieved on Nov. 10, 1999; entire document.
Pearson, J.; "Satellite Sailing," Spaceflight vol. 27, Sep./Oct. 1985, pp. 362–363.
Pearson, J.; "The Satellite Sail: a New Device for Applying Aerodynamic Forces to Spacecraft," *Journal of the British Interplanetary Society*, vol. 37, pp. 172–176, 1984.
Edmund Scientific's Scientifics, "1996 Annual Science Catalog for Educators, Students and Inventors," Invader Kite, p. 11.
J.J. Vorachek, "A Comparison of Several Very High Altitude Station Keeping Balloon Concepts," 1970, presented at 6th AFCRL Symposium.
R.S. Ross, "Advanced Balloon Systems as Photographic Platforms," 1969, presented at Earth Observations from Balloons, a symposium.
Jack Beemer, et al., "POBAL–S, The Analysis and Design of a High Altitude Airship," 1975, prepared for Air Force Cambridge Research Laboratories.

(List continued on next page.)

*Primary Examiner*—J. Woodrow Eldred
(74) *Attorney, Agent, or Firm*—Morrison & Foerster LLP (57) ABSTRACT

A device to provide control of the trajectory of a lighter than air vehicle, such as a balloon, is provided. A lifting device, such as a wing on end, is suspended on a tether well below the balloon to take advantage of the natural variation in winds at different altitudes. The wing can generate a horizontal lift force that can be directed over a wide range of angles. This force is transmitted to the balloon by the tether. Due to this force, the balloon's path is altered depending on the relative sizes of the balloon and the wing. A relatively small amount of power is needed to control the system, possibly with a rudder. As the energy of the wind provides most of the force, the wind's energy does most of the work. The balloon is able to avoid hazards, to reach desired targets, to select convenient landing zones, and to provide other operational advantages. As a result, fewer flights must be terminated early due to an inability to control the trajectory, and it is easier to obtain permission to launch since a planned flight path can be achieved within a greater range of conditions.

62 Claims, 7 Drawing Sheets

OTHER PUBLICATIONS

K.T. Nock, K.M. Aaron, et al., "Balloon Altitute Control Experiment (ALICE)," 1995, presented at 11th AIAA Lighter-than-Air Systems Technology Conference.

E.R. Bourke II, Addendum to Presentation on a Unique Approach to Balloon Station Keeping, 1969, Raytheon Report R69-4041A.

Bernard Etkin, "Dynamics of Flight—Stability and Control," second edition, 1982, pp. 10-11.

B.W. McCormick, "Aerodynamics, Aeronautics and Flight Mechanics," 1979, pp. 479-483.

B.S. Massey, "Mechanics of Fluids," Third edition, 1976, p. 265.

* cited by examiner

BALLOON TRAJECTORY CONTROL SYSTEM

BACKGROUND OF THE INVENTION

1. Field of Invention

The present invention relates generally to controlling the trajectory of a balloon and more specifically to a control device located remotely from a balloon for providing desired forces for trajectory control.

2. Description of Related Art

Very few devices have been used to control the trajectories of free balloons, such as balloons carrying scientific atmospheric sensing instruments. Propeller-driven airships can control their trajectories, for example, through modulation of the speed and the pitch of a propeller. However, the attainable altitudes and payload masses for airships are quite restricted in comparison to those of free balloons. Free balloons carrying science instruments typically drift freely in the prevailing wind at a desired operating altitude. In many cases, launch of such balloons must be delayed until forecast winds are projected to carry the balloon system into a region of interest or away from a forbidden zone. Frequently, such balloon flights must be prematurely terminated to avoid flying over specified areas, to ensure that the payload can descend onto an appropriate landing site, or to avoid endangering densely populated regions. The ability to provide even a small amount of trajectory control could eliminate these reasons for termination.

Previous approaches considered to control the trajectory of free balloons have included propellers, altitude control to select different wind directions, and drag chutes on long tethers.

Propellers require substantial power to drag a balloon through the atmosphere. The air has very low density at the high altitudes typically required of scientific balloons. At these high altitudes, propellers must be quite large in order to generate substantial lift. Also, significant amounts of power are typically unavailable for balloon systems due to the inherent need to keep weight to a minimum. If the power is generated using solar cells, then nighttime operation is not possible without very heavy batteries. If combustion provides the propulsive power, then the duration is limited by the weight of portable fuel. These requirements for propulsive power are at odds with the need to keep the weight low.

Several studies have been performed of concepts to propel lighter-than-air (LTA) vehicles. Naturally-shaped balloons driven by propellers suspended on relatively short tethers are discussed in "A Comparison of Several Very High Altitude Station Keeping Balloon Concepts," by J. J. Vorachek, presented at 6th AFCRL Symposium, 1970, and "Advanced Balloon Systems as Photographic Platforms," by R. R. Ross, presented at Earth Observations From Balloons, a Symposium, 1969. Both references discuss studies wherein naturally shaped balloons with a propeller and a power plant, both suspended on a tether, were tested in flight. According to these references, the operation of such devices would be limited to a couple of days due to the large propulsive energy required. These references also discuss the difficulties associated with operating engines at high altitude. Air breathing engines require several stages of supercharging to increase the density to the point that it will burn efficiently with fuel. In addition, both combustion engines and electric engines suffer from the difficulty of rejecting the substantial waste heat to prevent overheating in the low density atmosphere.

Another propeller driven LTA vehicle was designed, as described in "POBAL-S, The Analysis and Design of a High Altitude Airship," prepared for Air Force Cambridge Research Laboratories by Jack Beemer, et al., of Raven Industries in 1975. This document describes a propeller-driven airship designed to operate at an altitude of 21 km for a period of about a week.

Both the propeller-driven balloon and the propeller-driven airship described above were designed to maintain the position of an LTA vehicle above a specific point on the ground. Such operation requires the LTA vehicle to fly at a relative speed equal to the wind speed at the operating altitude. Since winds can have speeds in the range 15–50 m/s (50–150 ft/s), this leads to significant power requirements.

An alternative approach is to control the altitude of an LTA vehicle to select an altitude at which the wind is moving in a favorable direction (or at least close to a desired direction). This is the main trajectory control technique used by sport balloonists with either hot-air balloons or helium balloons. Selecting altitudes at which the balloon will float in order to select different drift directions also has many drawbacks. First, some means of controlling altitude must be provided. Operators of hot air sport balloons can raise or lower the temperature of the lifting gas to adjust altitude, while operators of helium balloons tend to alternate between dropping ballast weight and venting lifting gas. This use of consumables ultimately limits the duration of the mission. Furthermore, carrying the ballast reduces the weight available for the payload. Another drawback is that many balloon-borne science instruments, especially those used in astronomy and astrophysics experiments, need to be above most of the atmosphere (99%) and cannot acquire high quality data at lower altitudes. Furthermore, good knowledge of the wind is needed at different altitudes in order to select an appropriate altitude. Such detailed knowledge is usually unavailable during the flight. Thus, sport balloon flying often involves significant trial-and-error in seeking favorable altitudes.

One approach for the control of altitude without the use of ballast involved one balloon filled with helium and a second bag filled with a much denser refrigerant. At low altitudes, the refrigerant was a gas. At high altitude, the refrigerant condensed into a liquid. Thus, above a certain altitude, since the displaced volume of air decreased by the volume of gas that condensed, the overall buoyancy of the system decreased. As the system descended into warmer air at a lower altitude, the liquid vaporized again, thus expanding to displace a large volume of air. At this point, the buoyancy exceeded the weight and the system ascended again. The system naturally cycled over a large range of altitudes without discharging helium or ballast. This approach is described in "Balloon Altitude Control Experiment (ALICE)," by K. T. Nock, K. M. Aaron, et al. 11th AIAA Lighter-than-Air Systems Technology Conference, 1995. By trapping the liquid refrigerant in a pressure vessel and releasing it back into the sealed bag, it would be possible to provide some control over the altitude. The time scale involved for each altitude cycle was a few hours. This altitude control scheme does not work in the stratosphere; it requires the particular variation of temperature and pressure in the troposphere.

A drag device, such as a parachute, can be deployed a significant altitude below a balloon where the winds will usually be blowing in a different direction. Such an approach is described in Raytheon report R69-4041A, "Unique Approach to Balloon Station Keeping," by E. R. Bourke II, 1969. This approach can be used to generate a force that will cause the balloon to move relative to the surrounding air. However, the direction of the force is restricted essentially to the direction the wind is blowing at the altitude of the parachute. It is possible to use a winch to raise or lower the parachute to altitudes with different wind directions, but this may require a significant amount of time for changing the direction of the force. Also, a significant amount of power may be required to raise such a device in the presence of both gravity and aerodynamic drag. In addition, good knowledge of the wind distribution with altitude is required.

SUMMARY OF THE INVENTION

Accordingly, it is an object of this invention to provide an efficient force-generating device to control the trajectory of a balloon. The force-generating device should preferably be oriented so that the lift force is predominantly horizontal and transverse to the motion of the balloon.

It is a further object of the current invention to provide a balloon control device that passively exploits natural wind conditions, permits the balloon to remain at a fixed altitude and induces air flow past the balloon to sweep away contaminants.

It is a further object of the current invention to provide a device which requires very little power and can be operated efficiently at night.

The above and related objects of the present invention are realized by a system that includes a lift-generating device arranged to provide most of its lift in a horizontal direction, suspended from a balloon or other lighter-than-air system on a tether. The system may also include a flap or rudder for the purpose of changing the lift generated by the lift-generating device. The lift-generating device and flap (or rudder) may be mounted on a frame, such as a boom, or else integrally joined.

According to one aspect of the invention, the lift-generating device includes a sail. In another aspect, the lift-generating device includes a wing. In a third aspect, the lift-generating device includes a portion of a whirligig arrangement.

The flap may operate to change the lift generated by the lift-generating device by means of a change in orientation or motion of the lift-generating device. The tether is preferably sufficiently long so as to take advantage of natural wind differences with altitude.

The inventive device disclosed uses very little power to operate, can operate at night, can be made of very light-weight materials, does not require detailed knowledge of the wind field, allows the balloon to remain at a fixed altitude, generates control forces having a greater range of magnitude and direction as compared with a comparably sized drag device, can change the direction of the control force fairly rapidly, and operates at an altitude lower than the balloon where the air density is greater so that the device can be relatively small compared with the balloon.

Another advantage relates to the support of scientific instruments. Some very sensitive science instruments measure trace gases in the atmosphere at very low concentrations of a few parts per billion. Contaminants from the balloon itself, such as the helium lifting gas, or volatiles from the envelope material, can interfere with these sensitive measurements. A typical balloon drifts along with the local air mass and these contaminants accumulate in the vicinity of the balloon and gondola. Even a small relative airflow, such as would be caused by operation of the trajectory control device, will sweep away these contaminants and provide a fresh flow of air samples to the science instruments.

Significant variations with altitude exist for wind speed and direction. By operating the force-generating device well below the balloon (perhaps several kilometers below), a significant wind difference between the balloon and the force generating device is essentially guaranteed. The direction of the wind is not overly important since the magnitude and direction of the lift force can be varied over a substantial range by controlling the angle of attack of the wing, much like the ability of sailboats to travel in many different directions in the same wind.

Further objects and advantages of the current invention will become apparent from a consideration of the drawings and detailed descriptions.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EXEMPLARY EMBODIMENTS

Figure 1:
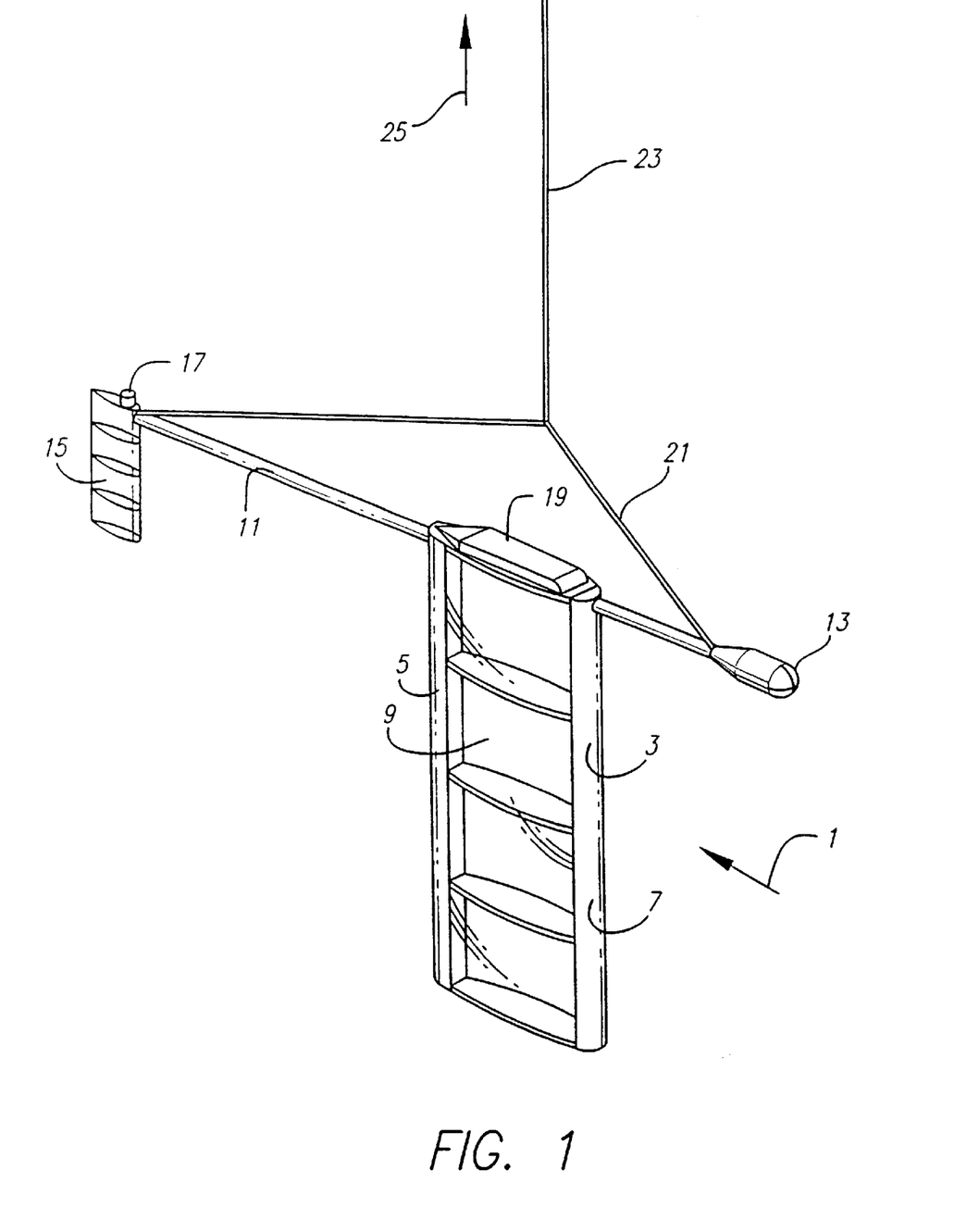
FIG. 1 illustrates a first embodiment of the trajectory control device.

A preferred embodiment of the balloon trajectory control device of the present invention is illustrated in perspective in FIG. 1. The main lift-generating element is a wing 1 comprising a leading edge spar 3, a trailing edge spar 5, and a plurality of ribs 7. The leading edge spar 3, trailing edge spar 5 and ribs 7 support skin 9. The wing 1 is attached to a boom 11 having a front end and a back end. A counter-weight 13 is attached to the front end of the boom 11. A rudder 15 and rudder actuator 17 are attached to the back end of the boom. A control module 19 is mounted at a convenient location on the device. The control module includes a power source (not shown), if required, comprising a battery and a solar panel. A yoke 21 connects the boom 11 to a tether 23. The upper end of the tether is attached to a winch 25 (not shown) mounted to an LTA system (e.g. a gondola of a balloon).

The balloon trajectory control device shown in FIG. 1 is lowered from the LTA vehicle such as a gondola of a floating balloon on the tether 23 that is relatively long. The length of the tether 23 may be several kilometers. The reason for the long tether 23 is to place the trajectory control device in a portion of the atmosphere at which the wind has a significantly different velocity (speed or direction) from the wind at the altitude of the balloon. Typical wind profiles are shown in FIG. 30.1 in "A Comparison of Several Very High Altitude Station Keeping Balloon Concepts" by J. J. Vorachek, cited above.

The tether 23 is unwound from a spool using the winch 25 mounted on the LTA vehicle. The winch 25 may be powered or it may simply provide a passive means of lowering the trajectory control device at an acceptable rate, with the weight of the trajectory control device serving to pull out the tether 23. In the latter case, the trajectory control device may be discarded at the end of the flight by severing the tether 23 and providing a parachute for the device to control its rate of descent. If the winch 25 is powered, it may be used to raise or lower the trajectory control device as desired to reach favorable altitudes or to restow the device. If used with a sport balloon, the winch 25 may be operated manually, or even eliminated. Under some conditions, the device could be hauled up hand-over-hand.

The tether 23 may be a rope or a cable, for example, woven Kevlar thread. More generally the tether 23 may be a non-rigid mechanical connection, for example, a chain which is comprised of rigid links. A completely rigid tether may place severe structural limitations on the length of the tether because of the weight of components. The boom 11 may be a simple rigid member used for mounting the components of the system; more generally, this function could be accomplished by a frame, not necessarily rigid, suitable for this purpose. The rudder 15 may be a simple rigid member used for changing the orientation of the system; more generally, this function could be accomplished by a flap suitable for this purpose.

The angle of attack of a lifting surface (e.g., a wing) is defined as the angle between the relative wind and a reference chord line (i.e., a line running from the leading edge to the trailing edge of the wing). Most aerodynamics texts include a definition of angle-of-attack. For example, a more precise definition can be found on page 10 of "Dynamics of Flight—Stability and Control," second edition, by Bernard Etkin, Wiley and Sons 1982, incorporated herein by reference. The angle of attack of the wing 1 is adjusted by setting the angle of the rudder 15 by means of the rudder actuator 17 under the control of the control module 19. This arrangement of a small control surface behind a large lifting surface is very analogous to the arrangement of the wing and stabilizer/elevator for an aircraft. It is also very similar to the arrangement of the keel and rudder of a sailboat.

In order to keep the wing 1 operating in a stable attitude, the center of mass of the suspended device must be somewhat ahead of the aerodynamic neutral point defined analogously to the neutral point of an aircraft. If the suspension point, which will be essentially directly over the center of mass, is too far back, then the assembly will swing around, perhaps going tail first, or crabbing along sideways with the wing stalled aerodynamically. Although this is not the primary intended mode of operating, it might actually be an advantageous state for certain wind conditions in which a large drag force is in the desired direction. A moving mass may be incorporated into the design of the device to adjust the center of mass so as to induce this kind of behavior. For the wing 1 to fly normally (i.e., not stalled), the center of mass should be sufficiently far forward, thereby necessitating the counterweight 13. Since LTA vehicles usually have severe weight constraints, it is undesirable to add "dead" weight. For this reason, the control module 19, which may constitute a significant fraction of the total weight, may be positioned somewhat ahead of the lift-generating device and serve additional duty as a counterweight. However, as for an aircraft, moving the center of mass too far forward will reduce the ability of the rudder to control the angle of attack of the main wing 1. It is desirable for the center of mass to be placed in the same range as for subsonic aircraft. For such aircraft, the center of mass typically is placed within the approximate range of 5% to 15% of the mean wing chord ahead of the neutral point. The prediction of the neutral point location is somewhat involved, but the procedure is generally known to those of ordinary skill and is available from numerous references. The longitudinal stability for aircraft can be found in "Aerodynamics, Aeronautics, and Flight Mechanics," by B. W. McCormick, Wiley 1979 on pages 479–483, incorporated herein by reference. The wing and horizontal stabilizer of the aircraft are analogous to the wing 1 and rudder 15 of the trajectory control device. The lateral component of the force from the tether 23 is analogous to the weight of the aircraft when the pitching moment equations are developed.

Also in analogy to aircraft, a canard configuration could be used in the trajectory control device. In a canard configuration, the smaller stabilizing surface is placed ahead of the main lifting surface. This is discussed more fully below.

Depending upon the needs of the particular balloon flight, the control module 19 may receive commands from the balloon gondola by radio or by other communication means. Alternatively, the control module 19 may be preprogrammed prior to launch of the balloon system.

One of the advantages of the trajectory control device is that it can be operated in different modes with more or less complexity depending on the desired degree of trajectory control. For example, if the purpose is simply to provide a bias airflow past the supporting balloon to sweep away contaminants to improve the performance of sensitive instruments, then the rudder 15 could be set at a fixed angle before the flight. This fixed angle could be selected based on a desired relative velocity coupled with prior knowledge of the expected winds at the altitudes of the balloon and the wing 1.

The prevailing winds typically are in a generally easterly or westerly direction depending on the season. A long duration balloon may go around the earth several times. In order to force a general drift towards the pole of the earth (or perhaps away from the pole and toward the equator), then the angle could be preset before launch based on the known prevailing winds and the desired drift direction.

If the device is used to assist a long distance sport balloonist, a left-zero-right control scheme may be adequate. The pilot could send a command to the device corresponding to maximum lift to the left, maximum lift to the right, or zero lift. This would permit the balloonist to avoid overflight of populated regions or to aid in achieving a desired landing site. In the zero lift (zero angle-of-attack) condition, the only significant aerodynamic force would be the drag. This would have relatively small influence on the drift rate of the balloon.

A more complex control scheme, perhaps under autonomous control, could command the wing 1 to "tack" downwind across the wind. The wing would traverse a long zigzag pattern across the average flight path. This would increase the relative wind speed of the wing and therefore the maximum aerodynamic force too. This approach could provide significantly greater control over the trajectory direction, requiring a more involved set of control algorithms.

If the trajectory requirements are sufficiently well known before the flight, then it may be possible to program the controller thus eliminating the need for a command link. In this case, a navigational system would be added (e.g., a Global Positioning System unit).

Since it is likely that the payload (located in the gondola) will have a command link (e.g. radio) to remote operators, another command link (perhaps a wire in the tether) between the gondola and the trajectory control device could be used to relay directions to the trajectory control device. Alternatively, the device could be controlled by a separate direct command link from the ground to the device.

For the passive control approaches described above, no power source is required since the rudder can be preset. For the controlled versions, some power source will be needed to move the rudder 15 and perhaps to communicate with the LTA system. Various power sources could be used. For short duration missions, a primary (non-rechargeable) battery may be sufficient. For longer flights, a solar panel may be a preferred choice, coupled with a rechargeable battery to continue operation in the dark.

If coupled with a powered lighter than air vehicle, such as a blimp or dirigible, then the trajectory control device may be able to provide a component of lift against the wind, somewhat similar to the tacking of a sailboat. A possible advantage of using the wing to augment the propulsion of the airship is that it operates in much denser air and can therefore generate a significant aerodynamic force, which may reduce the energy required for the airship.

For many of the control schemes described above, a set of sensors would be installed to measure useful aerodynamic data that would be helpful in controlling the operation. A typical suite of sensors may measure angle-of-attack, wind speed, temperature, pressure, humidity, etc. For control schemes that vary the operating altitude to improve performance, it may be desirable to disperse several instrument packages along the tether to take direct measurements of conditions at different altitudes.

Figure 2:
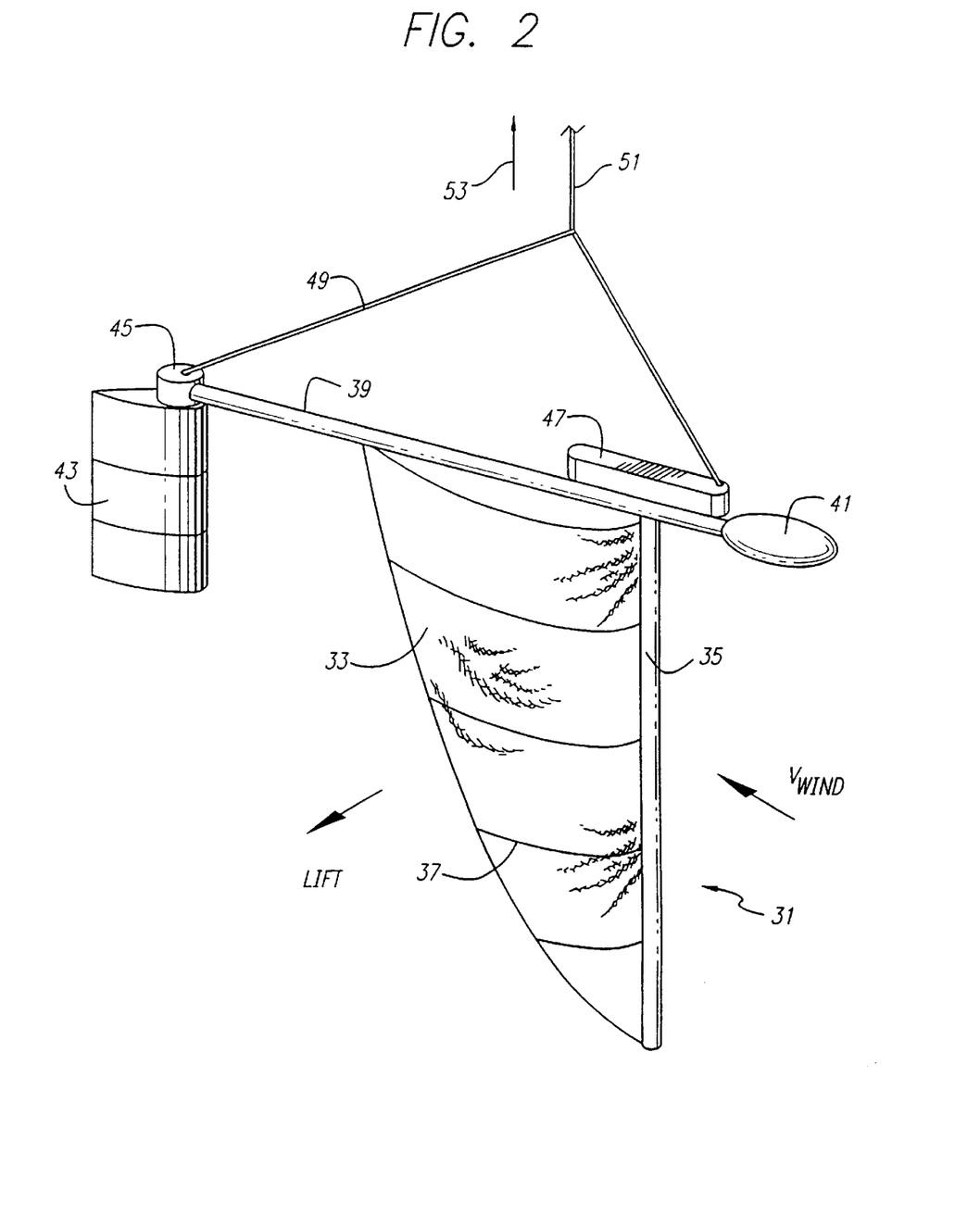
FIG. 2 illustrates a second embodiment of the trajectory control device using an inverted sail.

A second embodiment of a balloon trajectory control device is shown in FIG. 2. The main lift-generating element 31 is shown comprising an inverted sail 33, a mast 35, and a plurality of battens 37. The sail 33 and mast 35 are attached to a boom 39 having a front end and a back end. A counterweight 41 is attached to the front end of the boom. A rudder 43 and rudder actuator 45 are attached to back end of the boom. A control module 41 is mounted at a convenient location. The control module 41 includes a power source (not shown), if required, comprising a battery and a solar panel. A yoke 49 connects the boom to a tether 51. The upper end of the tether is attached to a winch 53 (not shown) mounted to an LTA system (e.g. a gondola of a balloon).

The operation of the sail version of the trajectory control device is very similar to the operation of the wing version (FIG. 1). The use of a sail rather than a double-sided airfoil section is expected to have somewhat less efficient aerodynamic performance. However, this may be offset by the possible lower cost and mass. Indeed, it may be possible to use an existing sailboat sail rather than developing a custom design.

Battens are thin ribs inserted into horizontal pockets sewn into sails to stiffen the sail material, to improve the aerodynamic shape, and to reduce luffing (i.e., flapping in the wind). They are often used on catamaran sailboats with their higher speed than regular sailboats. Although not required for the essential operation of the trajectory control device, it is expected that battens 37 will improve performance for the same reasons they are used in sailboat sails.

The rudder is shown as a "flying" control surface meaning that the entire aerodynamic surface is rotated. For structural reasons, it may be preferable to use a more conventional fixed fin and moveable rudder. Either will serve the functions of stabilizing the weathercock motion of the main lifting surface and adjusting the angle of attack of the main lifting surface.

In FIG. 2, the control module 47 is shown with a more forward position indicating its ability to act in part as a counterweight.

Figure 3:
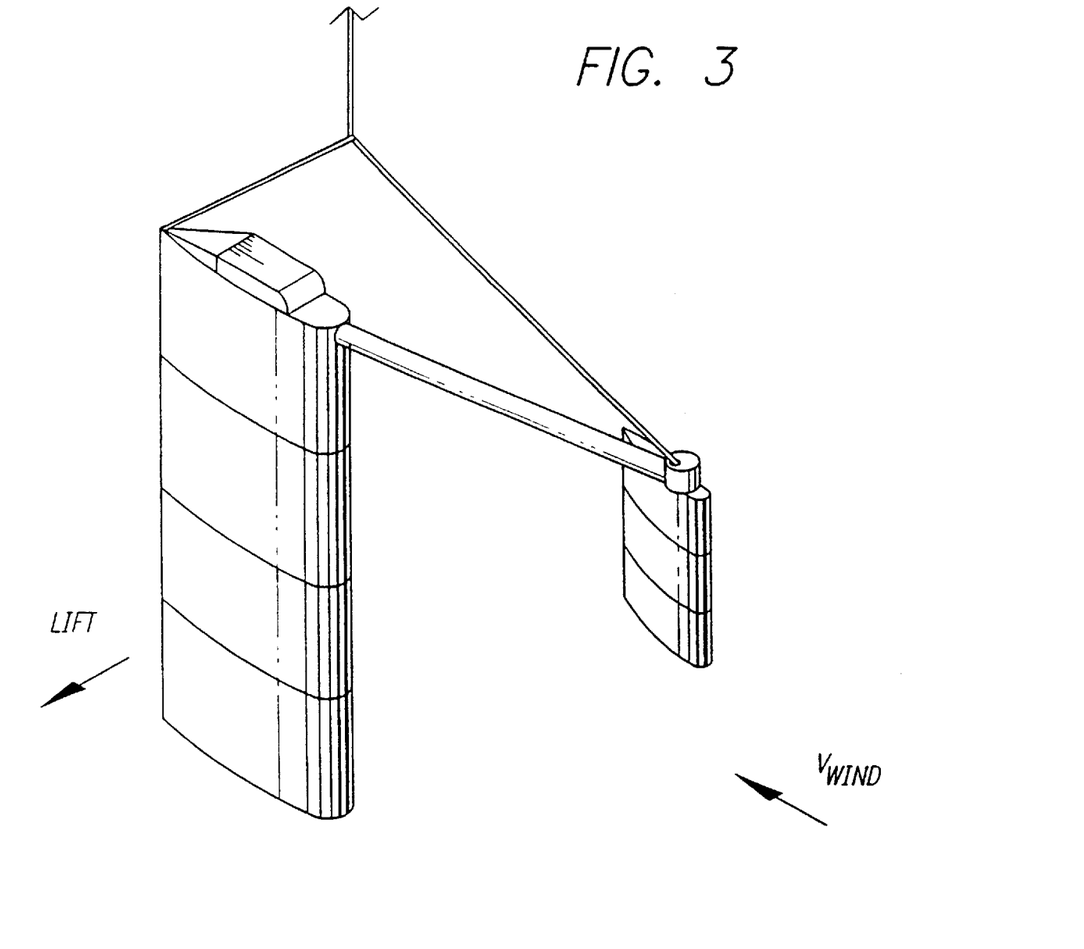
FIG. 3 illustrates a third embodiment of the trajectory control device with a canard configuration.

A third embodiment of a trajectory control device is shown in FIG. 3. In this embodiment, the stabilizing surface is placed ahead of the main lifting surface. When used on an aircraft, the small forward stabilizer is called a canard and the arrangement is referred to as a canard configuration.

The operation of the canard configuration is very similar to the operation of the preferred embodiment with its conventional arrangement (stabilizer behind the main wing). Although the canard configuration looks unstable, the requirement that the center of gravity be ahead of the neutral point is identical to that of the conventional configuration.

Figure 4:
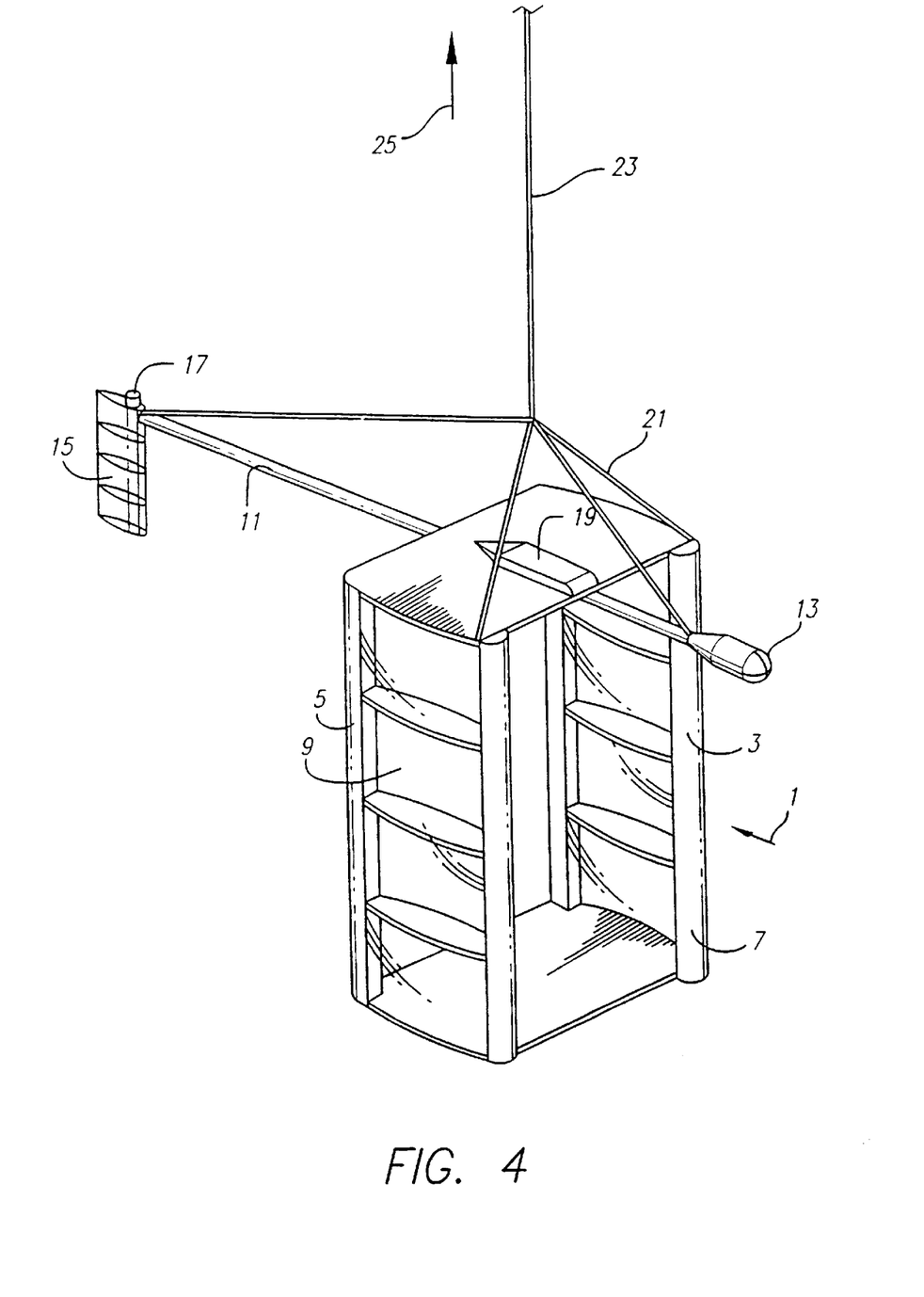
FIG. 4 illustrates a fourth embodiment of the trajectory control device with a biplane arrangement of wings.

A fourth embodiment of a trajectory control device is shown in FIG. 4. In this embodiment, a biplane arrangement is used for the main lifting generating element. It is shown with a conventional arrangement with the stabilizer behind the main wings.

The operation of the device with a biplane (or triplane, or more) is identical to the operation with a single wing. An advantage of this configuration is structural: the box-like structure has inherently greater stiffness than for a monoplane. Similarly, the rudder could comprise multiple surfaces as well.

Figure 5:
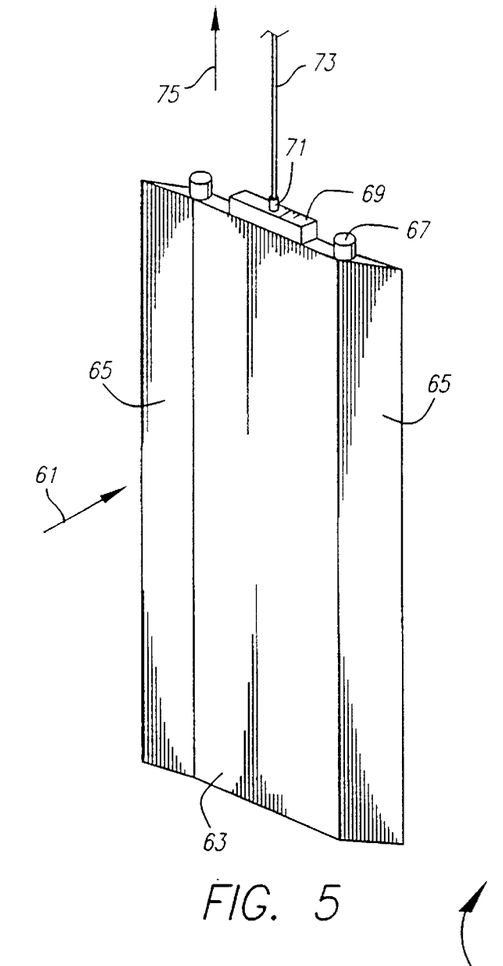
FIG. 5 illustrates a third embodiment of the trajectory control device using a whirligig arrangement.

A fifth embodiment of a trajectory control device is shown in FIG. 5. The control device comprises a whirligig arrangement 61, whereby the device turns in the wind while generating a lift force.

The whirligig arrangement 61 comprises a panel 63, at least one control flap 65, and at least one control flap actuator 67. The particular embodiment shown includes two flaps. The flaps 65 are hinged such that the angle between the flaps and the panel can be adjusted. A control module 69 is mounted at a convenient location. The control module includes a power source (not shown), if required, comprising a battery and a solar panel. A swivel 71 connects the whirligig arrangement 61 to a tether 73 which is connected to a winch 75 (not shown) attached to an LTA vehicle.

The construction of the whirligig arrangement can be accomplished in several ways, as would be apparent to one skilled in the fabrication of lightweight aerodynamic surfaces. For example, ribs can be formed using lightweight tubes and covered with a thin fabric or polymeric film. For some classes of missions, the panels can be formed from a low-density essentially solid material such as Styrofoam. These comments apply equally well to all embodiments.

Figures 11, 12:
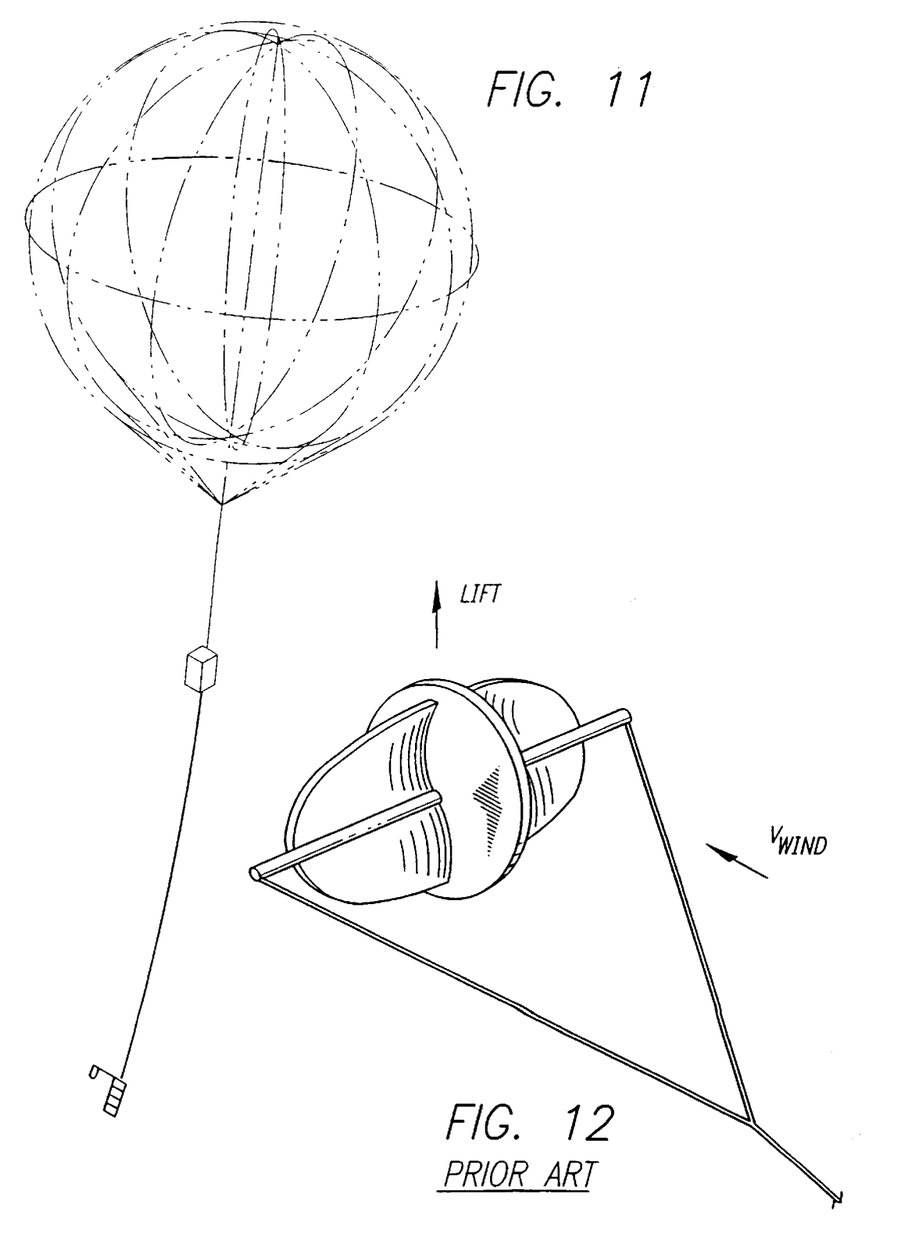
FIG. 11 illustrates the first embodiment of the trajectory control device in context suspended from a lighter-than-air system such as a balloon.
FIG. 12 illustrates a prior art device similar to the whirligig arrangement.

By its design, the whirligig arrangement 61 turns in the wind while generating a lift force, analogously to designs of various toys or kites. A whirligig design from the prior art is illustrated in FIG. 12, where the directions of wind and lift force are shown. This effect whereby there is a force perpendicular to the relative airflow is the Magnus effect, which accounts for curve balls in sports. This effect is discussed further on page 265 in "Mechanics of Fluids," third edition, by B. S. Massey, Van Nostrand, 1976, incorporated herein by reference. The whirligig design from the prior art comprises an elliptical styrofoam paddle with an S-shaped cross-section and a stiffening stick running through the long axis of the ellipse. The ends of the stick are connected by swivels to a yoke of string, which is fastened to the kite string. This toy operates with the stick horizontal and generates a vertical force due to the rotation in the wind. The upward force is sufficient to overcome the weight of the toy, which is stabilized by its central disk structure.

Figure 6:
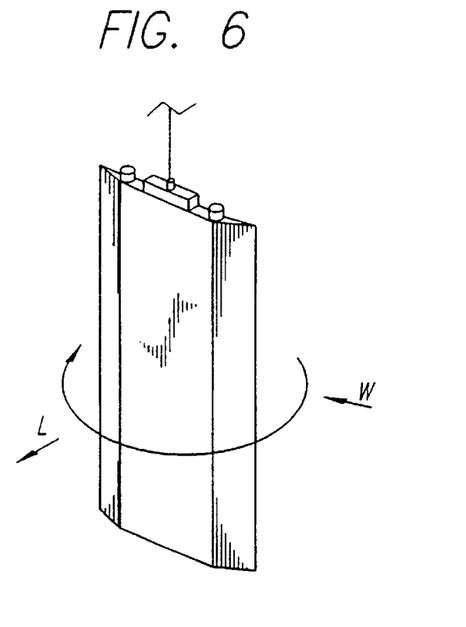
FIG. 6 illustrates the direction of rotation of the whirligig arrangement in a wind.

The whirligig arrangement 61 of FIG. 5 operates on the same principle, although its axis is vertical rather than horizontal so the lift force is to the side rather than upward. The whirligig arrangement 61 is suspended on the long tether 73 from an LTA vehicle such that, relatively speaking, there is a predominantly horizontal flow of air. When the control flaps 65 are deployed antisymmetrically as shown in FIG. 5 the whirligig 61 rotates about an axis that is essentially vertical. In FIG. 6 the direction of rotation is illustrated along with the directions of the wind W and the lift L. The whirligig will rotate in this direction regardless of the direction of the wind W. By reversing the angles of both flaps 65, the direction of rotation of the whirligig can be reversed. This will have the desired effect of changing the direction of the lift force L. Thus, if the orientations of the flaps 65 in FIG. 6 are reversed, then both the direction of rotation will be reversed as well as the direction of the resulting lift L.

Figure 7:
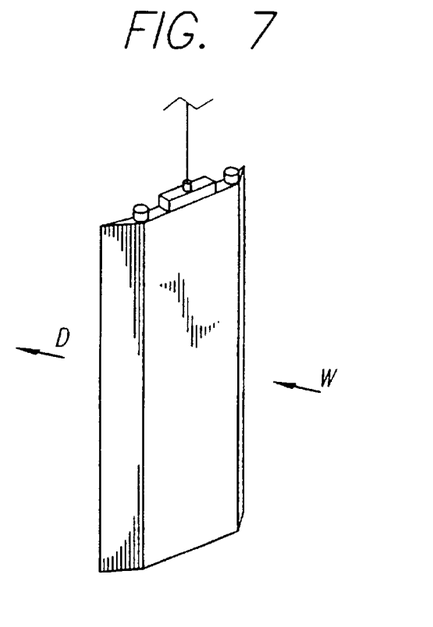
FIG. 7 illustrates the non-rotating whirligig arrangement with symmetric control flap deployment.

By deploying the flaps 65 symmetrically, the rotation will be suppressed and the panel 63 will stabilize broadside to the wind with the two flaps 65 angled back. This will have the effect of producing a pure drag force, which may be preferable depending on the wind directions and desired trajectory. FIG. 7 shows the configuration with two control flaps deployed symmetrically and indicates the direction of the drag force D due to the wind W.

By incorporation of the capabilities illustrated in FIG. 6 and FIG. 7, one can generate a range of effective forces by simple adjustment of each of the flaps. It is possible to vary the relative angles of the flaps between the extreme values of "up" and "down." In addition, cycling flap positions in sequence can create an effective or average force.

Figure 8:
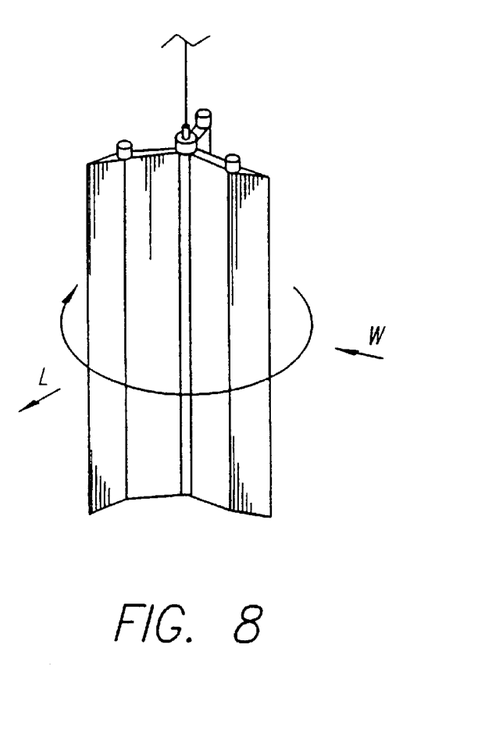
FIG. 8 illustrates an embodiment of the whirligig arrangement using three panels.
Figure 9:
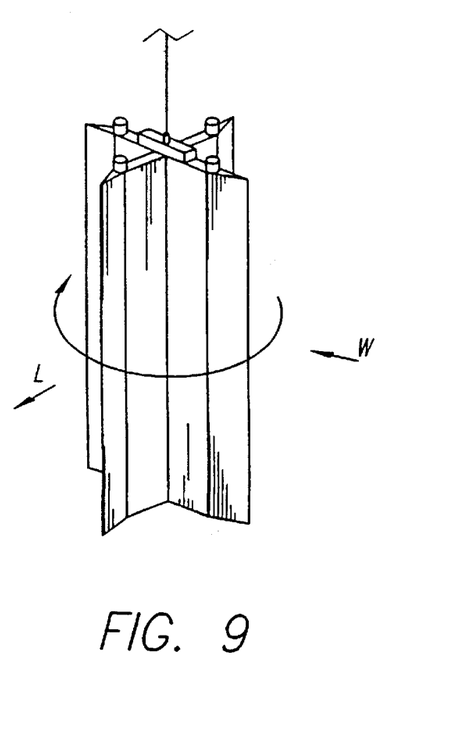
FIG. 9 illustrates an embodiment of the whirligig arrangement using four panels.

FIG. 8 shows an alternative embodiment of a whirligig arrangement with three panels 63 and three control flaps 65. FIG. 9 shows an alternative embodiment of a whirligig arrangement using four panels 63 and flaps 65. These figures indicate that the number of panels 63 can be varied significantly. Further, it is not necessary that each panel 63 have a control flap 65. A single control flap 65 may be sufficient to maintain rotation.

Figure 10:
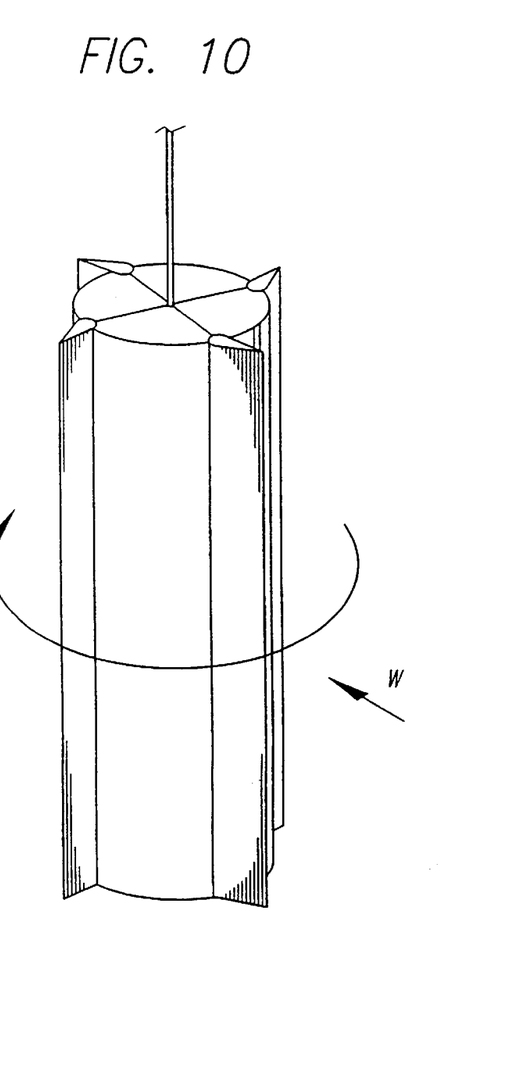
FIG. 10 illustrates an embodiment of the whirligig arrangement using a cylindrical cross-section.

FIG. 10 shows yet another embodiment of the whirligig arrangement in which a rotating cylinder is used as the lift-generating device. Control flaps 65 are also used to impart rotation to the cylinder.

Thus, a variety of whirligig arrangements are possible, and, even without a mechanism for control, lift generation can be achieved. The body of a whirligig arrangement refers generally to a structure suitable for the mounting of control flaps, control flap actuators, and control modules in a whirligig arrangement (e.g., the panel 63 in FIG. 5 and the cylinder in FIG. 10).

FIG. 11 illustrates the preferred embodiment of the trajectory control device shown in context suspended from a balloon and gondola. The relative scaling shown is somewhat arbitrary. The device can operate over a significant range of sizes. Also, the length of the tether is likely to be longer than shown, but no restriction of the length should be inferred from the diagram.

Any method of generating an aerodynamic force can be used to impart a force to the LTA vehicle. The particular examples of lift-generating devices illustrated here are intended to be exemplary, and not exclusive.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

I claim:

1. A trajectory-control device for a lighter-than-air system, comprising:
    a frame;
    a lift-generating device mounted on the frame;
    a flap mounted on the frame; and
    a tether, the tether having a first end connected to the frame and a second end for connecting the trajectory-control device to the lighter-than-air system, wherein the trajectory-control device passively generates force on the lighter-than-air system from airflow differences between the lighter-than-air system and the lift-generating device.

2. A trajectory-control device as claimed in claim 1, wherein the lift-generating device includes a sail.

3. A trajectory-control device as claimed in claim 1, wherein the lift-generating device includes a wing.

4. A trajectory-control device as claimed in claim 1, wherein the lift-generating device includes a body of a whirligig arrangement.

5. A trajectory-control device as claimed in claim 1, wherein the tether includes a cable.

6. A trajectory-control device as claimed in claim 1, wherein the frame includes a boom that connects the lift-generating device and the flap.

7. A trajectory-control device as claimed in claim 6, further comprising a counterweight mounted on the boom, wherein the counterweight adjusts a center of mass of the trajectory-control device.

8. A trajectory-control device as claimed in claim 1, further comprising:
    an actuator connected to the flap for adjusting a relative orientation of the flap; and
    a control system for commanding the actuator.

9. A trajectory-control device as claimed in claim 1, wherein the tether has an extended length of at least 0.5 km.

10. A trajectory-control device as claimed in claim 1, wherein the tether has an extended length that is sufficiently large for controlling a trajectory of the lighter-than-air system.

11. A trajectory-control device for a lighter-than-air system, comprising:
    a frame;
    a lift-generating device mounted on the frame;
    a flap mounted on the frame;
    an actuator connected to the flap for adjusting a relative orientation of the flap;
    a control system for commanding the actuator; and
    a tether, the tether having a first end connected to the frame and a second end for connecting the trajectory-control device to the lighter-than-air system, and the tether having an extended length of at least 0.5 km, wherein the trajectory-control device passively generates force on the lighter-than-air system from airflow differences between the lighter-than-air system and the lift-generating device.

12. A trajectory-control device for a lighter-than-air system, comprising:

a frame;

a lift-generating device mounted on the frame;

a flap mounted on the frame;

an actuator connected to the flap for adjusting a relative orientation of the flap;

a control system for commanding the actuator; and a tether, the tether having a first end connected to the frame and a second end for connecting the trajectory-control device to the lighter-than-air system, wherein the trajectory-control device passively generates force on the lighter-than-air system from airflow differences between the lighter-than-air system and the lift-generating device, and the tether has an extended length that is sufficiently large for controlling a trajectory of the lighter-than-air system.

13. A trajectory-control device for a lighter-than-air system, comprising:

a lift-generating device;

a flap mounted on the lift-generating device; and a tether, the tether having a first end connected to the lift-generating device and a second end for connecting the trajectory-control device to the lighter-than-air system, wherein the trajectory-control device passively generates force on the lighter-than-air system from airflow differences between the lighter-than-air system and the lift-generating device.

14. A trajectory-control device as claimed in claim 13, wherein the lift-generating device includes a body of a whirligig arrangement.

15. A trajectory-control device as claimed in claim 13, wherein the tether includes a cable.

16. A trajectory-control device as claimed in claim 13, further comprising:

an actuator connected to the flap for adjusting a relative orientation of the flap; and a control system for commanding the actuator.

17. A trajectory-control device as claimed in claim 13, wherein the tether has an extended length of at least 0.5 km.

18. A trajectory-control device as claimed in claim 13, wherein the tether has an extended length that is sufficiently large for controlling a trajectory of the lighter-than-air system.

19. A trajectory-control device for a lighter-than-air system, comprising:

means for generating lift from air velocity differences; and means for connecting the lift-generating means to the lighter-than-air system, wherein the connecting means is non-rigid, and the trajectory-control device passively generates force on the lighter-than-air system from airflow differences between the lighter-than-air system and the lift-generating means.

20. A trajectory-control device according to claim 19, wherein the lift-generating means includes means for controlling a lift force generated by the lift-generating means.

21. A trajectory-control device according to claim 19, wherein the connecting means has an extended length of at least 0.5 km.

22. A trajectory-control device according to claim 19, wherein the connecting means has an extended length that is sufficiently large for controlling a trajectory of the lighter-than-air system.

23. An aircraft comprising a lighter-than-air system and a trajectory-control device, the trajectory-control comprising:

a frame;

a lift-generating device mounted on the frame;

a flap mounted on the frame; and a tether, the tether having a first end connected to the frame and a second end connected to the lighter-than-air system, wherein the trajectory-control device passively generates force on the lighter-than-air system from airflow differences between the lighter-than-air system and the lift-generating device.

24. An aircraft as claimed in claim 23, wherein the lift-generating device includes a sail.

25. An aircraft as claimed in claim 23, wherein the lift-generating device includes a wing.

26. An aircraft as claimed in claim 23, wherein the lift-generating device includes a body of a whirligig arrangement.

27. An aircraft as claimed in claim 23, wherein the tether includes a cable.

28. An aircraft as claimed in claim 23, wherein the frame includes a boom that connects the lift-generating device and the flap.

29. An aircraft as claimed in claim 28, wherein the lift-generating device further comprises a counterweight mounted on the boom so that the counterweight adjusts a center of mass of the trajectory-control device.

30. An aircraft as claimed in claim 23, wherein the trajectory-control device further comprises:

an actuator connected to the flap for adjusting a relative orientation of the flap; and a control system for commanding the actuator.

31. An aircraft as claimed in claim 23, wherein the tether has an extended length of at least 0.5 km.

32. An aircraft as claimed in claim 23, wherein the tether has an extended length that is sufficiently large for controlling a trajectory of the lighter-than-air system.

33. An aircraft comprising a lighter-than-air system and a trajectory-control device, the trajectory-control device comprising:

a frame;

a lift-generating device mounted on the frame;

a flap mounted on the frame;

an actuator connected to the flap for adjusting a relative orientation of the flap;

a control system for commanding the actuator; and a tether, the tether having a first end connected to the frame and a second end connected to the lighter-than-air system, and the tether having an extended length of at least 0.5 km, wherein the trajectory-control device passively generates force on the lighter-than-air system from airflow differences between the lighter-than-air system and the lift-generating device.

34. An aircraft comprising a lighter-than-air system and a trajectory-control device, the trajectory-control device comprising:

a frame;

a lift-generating device mounted on the frame;

a flap mounted on the frame;

an actuator connected to the flap for adjusting a relative orientation of the flap;

a control system for commanding the actuator; and a tether, the tether having a first end connected to the frame and a second end connected to the lighter-than-air system, wherein the trajectory-control device passively generates force on the lighter-than-air system from airflow differences between the lighter-than-air system and the lift-generating device, and the tether has an extended length that is sufficiently large for controlling a trajectory of the lighter-than-air system.

35. An aircraft comprising a lighter-than-air system and a trajectory-control device, the trajectory-control device comprising:

a lift-generating device;

a flap mounted on the lift-generating device; and a tether, the tether having a first end connected to the lift-generating device and a second end connected to the lighter-than-air system, wherein the trajectory-control device passively generates force on the lighter-than-air system from airflow differences between the lighter-than-air system and the lift-generating device.

36. An aircraft as claimed in claim 35, wherein the lift-generating device includes a body of a whirligig arrangement.

37. An aircraft as claimed in claim 35, wherein the tether includes a cable.

38. An aircraft as claimed in claim 35, further comprising:

an actuator connected to the flap for adjusting a relative orientation of the flap; and a control system for commanding the actuator.

39. An aircraft as claimed in claim 35, wherein the tether has an extended length of at least 0.5 km.

40. An aircraft as claimed in claim 35, wherein the tether has an extended length that is sufficiently large for controlling a trajectory of the lighter-than-air system.

41. A method for trajectory control of a lighter-than-air system, comprising:

connecting a lift-generating device to the lighter-than-air system with a tether;

connecting a flap to the lift-generating device, wherein a relative orientation of the flap controls force on the lighter-than-air system that is passively generated from airflow differences between the lighter-than-air system and the lift-generating device; and adjusting the relative orientation of the flap.

42. A method as claimed in claim 41, wherein the lift-generating device includes a sail.

43. A method as claimed in claim 41, wherein the lift-generating device includes a wing.

44. A method as claimed in claim 41, wherein the lift-generating device includes a body of a whirligig arrangement.

45. A method as claimed in claim 41, further comprising: extending the tether so that the tether has an extended length of at least 0.5 km.

46. A method as claimed in claim 41, further comprising: extending the tether so that the tether has an extended length that is sufficiently large for controlling a trajectory of the lighter-than-air system.

47. A trajectory-control device for a lighter-than-air system, comprising:

a lift-generating device; and a tether, the tether having a first end connected to the lift-generating device and a second end for connecting the trajectory-control device to the lighter-than-air system, wherein the trajectory-control device passively generates force on the lighter-than-air system from airflow differences between the lighter-than-air system and the lift-generating device.

48. A trajectory-control device as claimed in claim 47, wherein the lift-generating device includes a body of a whirligig arrangement.

49. A trajectory-control device as claimed in claim 47, wherein the tether includes a cable.

50. A trajectory-control device as claimed in claim 47, wherein the tether has an extended length of at least 0.5 km.

51. A trajectory-control device as claimed in claim 47, wherein the tether has an extended length that is sufficiently large for controlling a trajectory of the lighter-than-air system.

52. An aircraft comprising a lighter-than-air system and a trajectory-control device, the trajectory-control device comprising:

a lift-generating device; and a tether, the tether having a first end connected to the lift-generating device and a second end connected to the lighter-than-air system, wherein the trajectory-control device passively generates force on the lighter-than-air system from airflow differences between the lighter-than-air system and the lift-generating device.

53. An aircraft as claimed in claim 52, wherein the lift-generating device includes a body of a whirligig arrangement.

54. An aircraft as claimed in claim 52, wherein the tether includes a cable.

55. An aircraft as claimed in claim 52, wherein the tether has an extended length of at least 0.5 km.

56. An aircraft as claimed in claim 52, wherein the tether has an extended length that is sufficiently large for controlling a trajectory of the lighter-than-air system.

57. A method for trajectory control of a lighter-than-air system, comprising:

connecting a lift-generating device to the lighter-than-air system with a tether for passively generating force on the lighter-than-air system from airflow differences between the lighter-than-air system and the lift-generating device.

58. A method as claimed in claim 57, wherein the lift-generating device includes a sail.

59. A method as claimed in claim 57, wherein the lift-generating device includes a wing.

60. A method as claimed in claim 57, wherein the lift-generating device includes a body of a whirligig arrangement.

61. A method as claimed in claim 57, further comprising: extending the tether so that the tether has an extended length of at least 0.5 km.

62. A method as claimed in claim 57, further comprising: extending the tether so that the tether has an extended length that is sufficiently large for controlling a trajectory of the lighter-than-air system.

* * * * *